(12) United States Patent
Nurmi

(10) Patent No.: US 7,362,312 B2
(45) Date of Patent: *Apr. 22, 2008

(54) MOBILE COMMUNICATION TERMINAL AND METHOD

(75) Inventor: Mikko A. Nurmi, Tampere (FI)

(73) Assignee: Nokia Corporation, Espoo (FI)

( * ) Notice: Subject to any disclaimer, the term of this patent is extended or adjusted under 35 U.S.C. 154(b) by 589 days.

This patent is subject to a terminal disclaimer.

(21) Appl. No.: 10/978,769

(22) Filed: Nov. 1, 2004

(65) Prior Publication Data

US 2006/0095846 A1    May 4, 2006

(51) Int. Cl.
*G09G 5/00* (2006.01)

(52) U.S. Cl. .................. 345/169; 345/156; 200/5 R

(58) Field of Classification Search ........ 345/156–169; 200/5 R, 6 A, 11 R, 8 R; 348/734; 463/37–38; 455/556.1, 556.2, 575.1, 575.2
See application file for complete search history.

(56) References Cited

U.S. PATENT DOCUMENTS

| | | | | |
|---|---|---|---|---|
| 5,808,602 A | * | 9/1998 | Sellers | ........................ 345/157 |
| 6,636,197 B1 | * | 10/2003 | Goldenberg et al. | ........ 345/156 |
| 7,154,479 B2 | * | 12/2006 | Balle et al. | ................... 345/169 |
| 7,170,497 B2 | * | 1/2007 | Husgafvel et al. | ........... 345/172 |
| 2003/0076301 A1 | * | 4/2003 | Tsuk et al. | .................... 345/159 |
| 2004/0253931 A1 | * | 12/2004 | Bonnelykke et al. | ....... 455/90.3 |

FOREIGN PATENT DOCUMENTS

| | | |
|---|---|---|
| WO | WO 02/39712 A2 | 5/2002 |
| WO | WO 03/044646 A2 | 5/2003 |
| WO | WO 2004/038573 A2 | 5/2004 |
| WO | WO 2004/044727 A1 | 5/2004 |

* cited by examiner

*Primary Examiner*—Richard Hjerpe
*Assistant Examiner*—Mansour M. Said
(74) *Attorney, Agent, or Firm*—Perman & Green, LLP

(57) ABSTRACT

A mobile communication apparatus comprising processor means and a user interface is disclosed. The user interface comprises a display and an input means. The input means comprises a rotating input means arranged to provide an angular movement signal in accordance with an angular movement of the rotating input means for selecting an item from a plurality of selectable items arranged to be presented on said display, wherein one or more of the selectable items are associated with a feedback signal, and the rotating input means is arranged to provide feedback according to the feedback signal to a user when operating the rotating input means in a position related to the items associated with a feedback signal. An input method for the mobile communication apparatus is also disclosed.

25 Claims, 2 Drawing Sheets

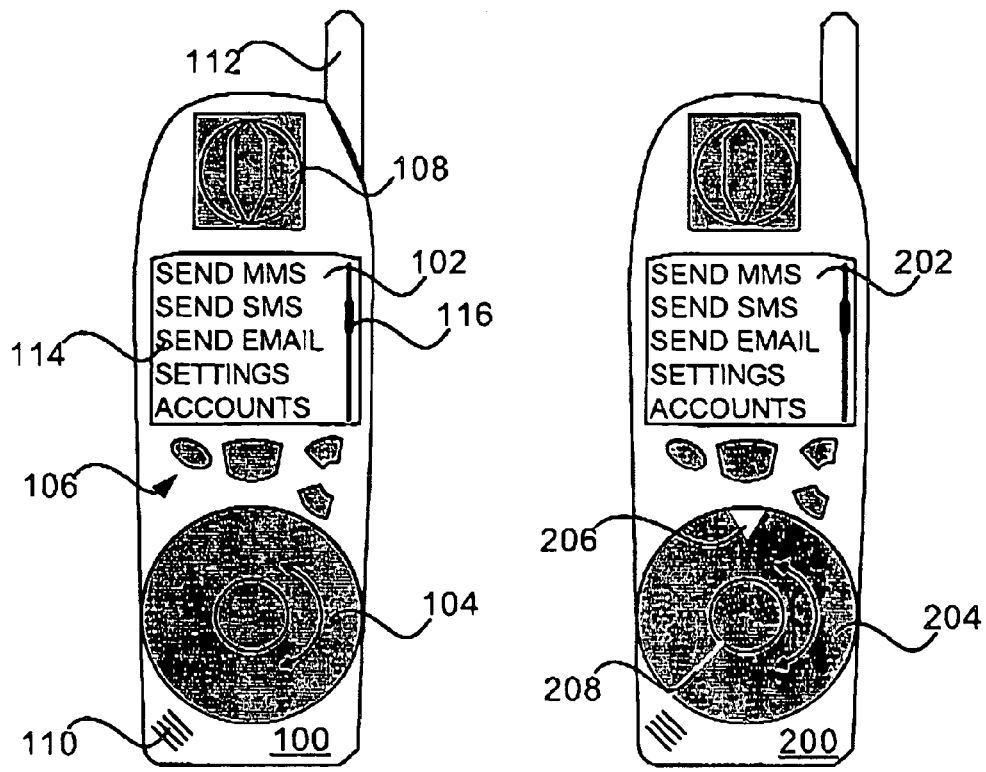
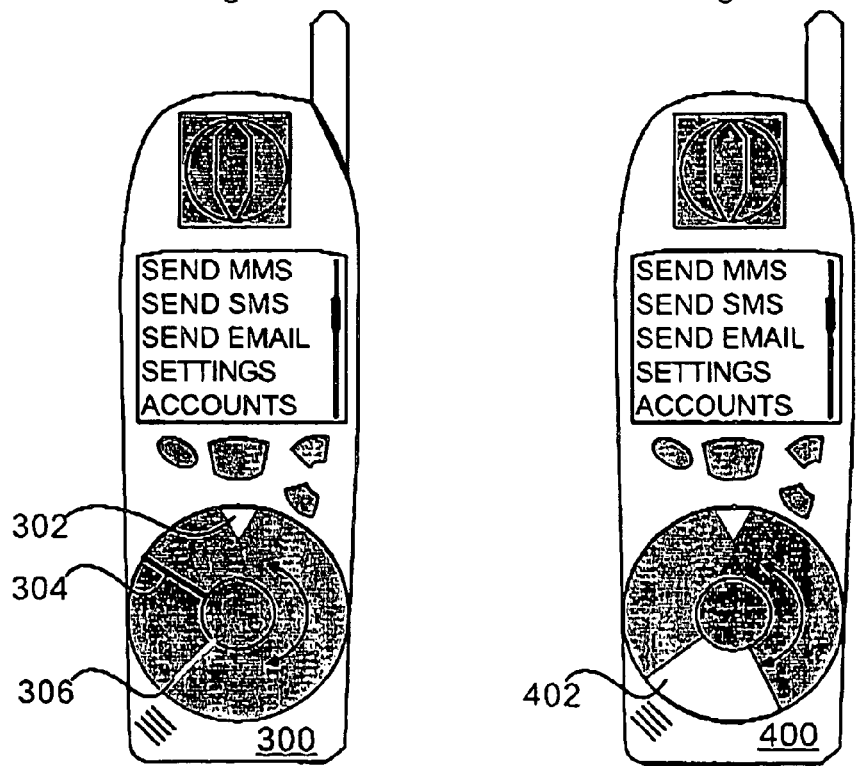
Fig. 1　　Fig. 2
Fig. 3　　Fig. 4

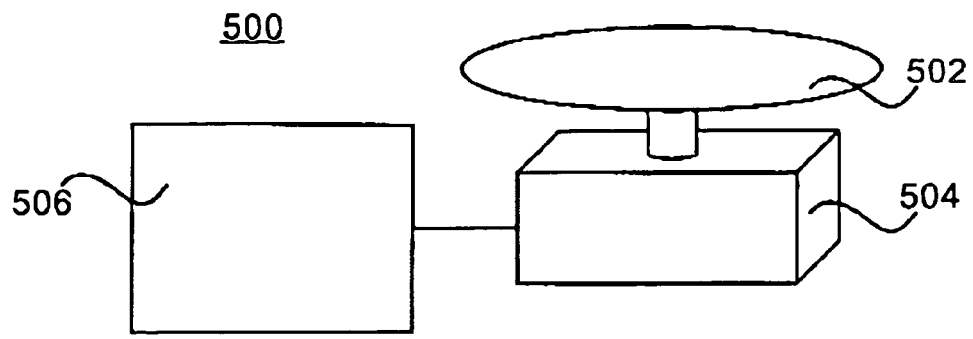
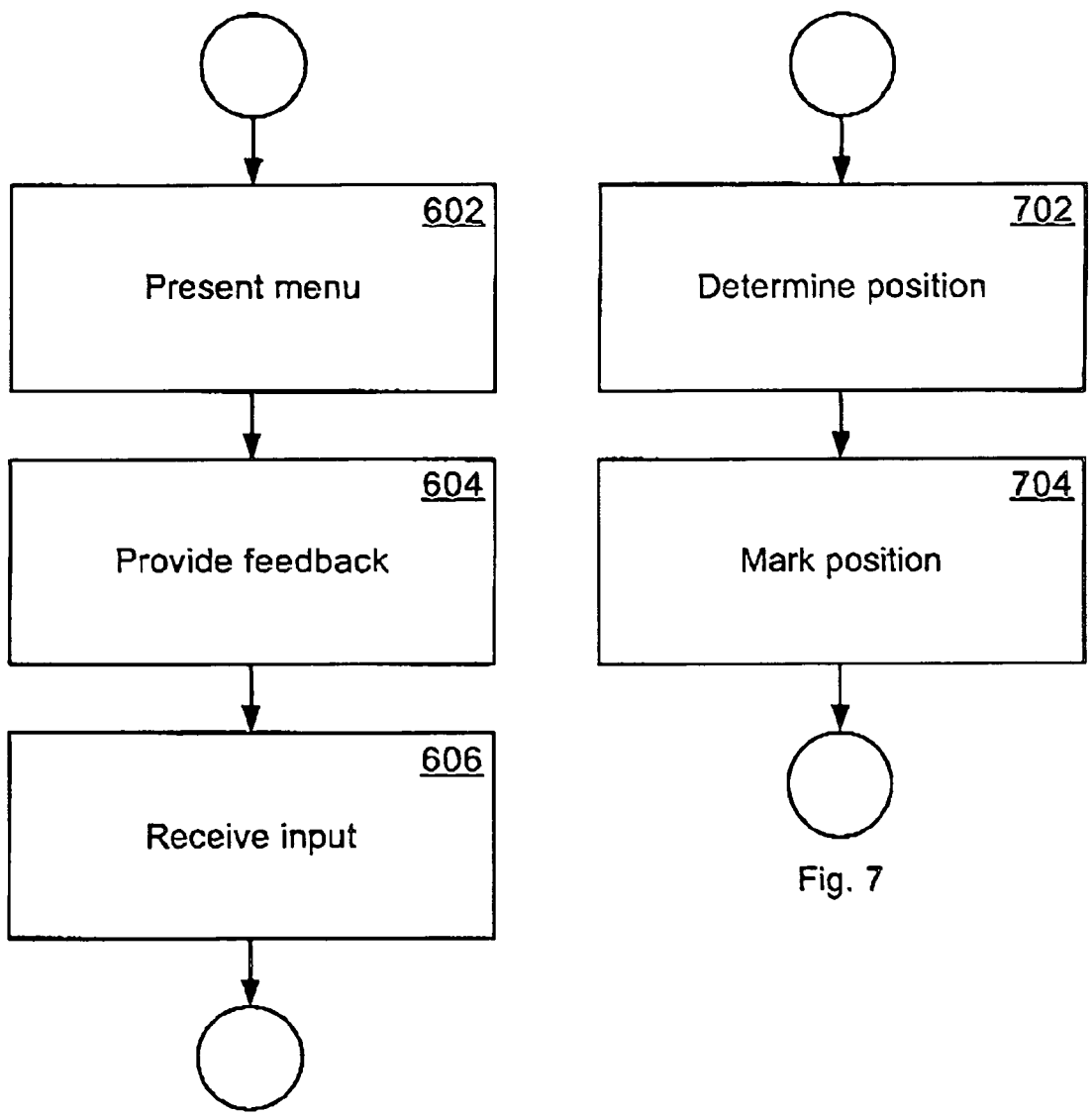

MOBILE COMMUNICATION TERMINAL AND METHOD

BACKGROUND OF THE INVENTION

1. Field of the Invention

The present invention relates to a mobile communication apparatus with a rotating input means with feedback, and an input method for such a mobile communication apparatus.

2. Brief Description of Related Developments

WO 02/39712 A2, which is hereby incorporated by reference, discloses an image control system for controlling a menu on a display in a television system. The menu comprises a plurality of simultaneously displayed menu items. A selector is arranged to select an item from the menu. A user input device comprises a control device to generate a control signal to move the selector relative to the menu. Further, a rotatable control is disclosed, wherein rotation of the control causes a corresponding rotation of the menu. Alternatively, a cursor is viewed on the menu screen that follows the menu items as a user operates the control device.

WO 02/39712 A2 further discloses applicability to mobile telephone menus. The menu on a screen of a telephone handset is shown as a two-dimensional circle. A rotary dial is provided on the front face of the handset. The handset has the usual features of a mobile telephone with the addition of the rotary dial positioned on the front face. On activation of the menu of the mobile telephone handset, the dial operates as the control device, described above with reference to the television system. Of course, there is no transmission of a remote control signal as in the television, but rather the signal is coupled to the display within the handset. To select an item from the menu a user rotates the dial until either the cursor has moved to be associated with the desired menu item or the menu has rotated so that the desired item has come into alignment with a selector region on the screen of the mobile telephone handset.

A mobile communication apparatus is used for a plurality of applications, and therefore require a high grade of adaptability for feasible handling. The solution presented in WO 02/39712 is adapted for handling a quite simple and static menu. As mobile telephone handsets include several applications, and the number of applications is increasing, this rotary input device will not be sufficient for a modern mobile communication apparatus.

The multitude of functions in a modern communication apparatus implies a user interface with menus with considerable sizes. To maintain usability of the communication apparatus, although increased complexity, selection from menus have to be improved.

SUMMARY OF THE INVENTION

It is therefore an obect of the present invention to provide a mobile communication apparatus and an input method with improved selection from menus.

The above object is obtained according to a first aspect of the present invention by a mobile communication apparatus comprising processor means and a user interface. The user interface comprises a display and an input means. The input means comprises a rotating input means arranged to provide an angular movement signal in accordance with an angular movement of the rotating input means for selecting an item from a plurality of selectable items arranged to be presented on said display, wherein one or more of said selectable items are associated with a feedback signal, wherein the rotating input means is arranged to provide feedback according to said feedback signal to a user when operating the rotating input means in a position related to said items associated with a feedback signal.

A rotating input means is a control wheel with a sensor for providing an input signal depending on the direction of rotation and the angular movement.

An advantage of this is that certain items of a menu or the like can be found more easily by a user.

The feedback signal may indicate graphical presentation, such that said feedback is presented graphically. The graphically presented feedback may be a visual mark at the rotating input means corresponding to a position related to an item associated with a feedback signal, wherein said item comprises a last selected item.

An advantage of this is that the user can find a previously known item more easily.

The graphically presented feedback may be a marked area of said rotating input means corresponding to positions related to a group of items associated with a feedback signal.

An advantage of this is that the user is able to find e.g. a certain kind of items more easily.

The feedback signal may indicate tactile feedback, such that said feedback is tactile. The feedback signal may indicate a sound presentation, such that said feedback is a sound. The feedback may correspond to a last selected item, or to an end item of a list of selectable items.

The above object is obtained according to a second aspect of the present invention by an input method for a mobile communication apparatus comprising processor means and a user interface. The user interface comprises a display and an input means. The input means comprises a rotating input means arranged to provide an angular movement signal in accordance with an angular movement of the rotating input means. The method comprises the steps of: presenting a menu comprising a plurality of items from a plurality of selectable items on the display, wherein one or more of said selectable items are associated with a feedback signal; providing a feedback according to said feedback signal; and receiving an input by the rotating input means corresponding to a selection of one of the plurality of selectable items.

The provision of feedback may comprise the step of providing a graphical presentation at the rotating input means. The graphical presentation may be a visual mark at a position of the rotating input means corresponding to a last selection performed by the rotating input means. The graphical presentation is a marked area at the rotating input means corresponding to a partition of selectable items.

The provision of feedback may comprise the step of temporarily increasing rotation resistance of the rotating input means. The temporary increase of rotation resistance may correspond to a position of the rotating input means corresponding to a last selection performed by the rotating input means. The temporary increase of rotation resistance may correspond to a position of the rotating input means corresponding to an end of a list of the plurality of selectable items.

The provision of feedback may comprise the step of presenting a sound or generating a vibration. The provision of feedback may correspond to a position of the rotating input means corresponding to a last selection performed by the rotating input means, or an end list of the plurality of selectable items.

The advantages of the second aspect of the invention are essentially the same as of the first aspect of the invention.

All or certain of the above features may be used in any combination for providing a feasible user interface with improved selection from menus.

BRIEF DESCRIPTION OF THE DRAWINGS

The novel features of the present invention are set forth in the appended claims. The invention itself, however, as well as preferred mode of use, further objects and advantages thereof, will best be understood by reference to the following detailed description of an illustrative embodiment when read in conjunction with the accompanying drawings, wherein:

FIG. 1 shows a mobile communication apparatus comprising a rotating input means with tactile feedback according to one embodiment of the present invention;

FIG. 2 shows a mobile communication apparatus comprising a rotating input means with visual feedback according to another embodiment of the present invention;

FIG. 3 shows a mobile communication apparatus comprising a rotating input means with visual feedback according to another embodiment of the present invention;

FIG. 4 shows a mobile communication apparatus comprising a rotating input means with visual feedback according to another embodiment of the present invention;

FIG. 5 schematically shows a rotating input means;

FIG. 6 is a flow chart of an input method according to one embodiment of the present invention; and FIG. 7 is a flow chart of sub-steps for provision of feedback.

DETAILED DESCRIPTION OF THE PREFERRED EMBODIMENT

FIG. 1 shows a mobile communication apparatus 100 comprising a display 102 and a rotating input means 104. The mobile communication apparatus further comprises a plurality of keys 106, a speaker 108, a microphone 110, an antenna 112, and a processor (not shown) for controlling all functions and devices of the mobile communication apparatus 100. Among these functions, a central function is user interface. A common way to implement the user interface in mobile communication apparatuses is a menu 114, where a user is enabled to select among a plurality of items. The items are presented on the display 102, and can be a text list, a plurality of icons, or a plurality of tabs, or any combination thereof. As the menus become more complex as the mobile communication apparatuses become more complex, while the size of the display 102 is limited because of the limited size of a feasible mobile communication apparatus 100. Often, this implies that not all items can be shown at a time in the display. Therefore, some indication of what part of the items which is shown is needed. One way to indicate this is to use a scroll bar 116. However, to enable a user to find certain items in the menu easier, the rotating input means 104 is provided with a tactile feedback, such that the user will feel an increased resistance in turning the rotating input means 104. Alternatively or additionally, a sound can be presented by a buzzer (not shown) or the speaker 108, and/or a vibrating function of the mobile communication apparatus can also provide feedback. The tactile, sound, or vibration feedback can appear when a last selected item is passed or reached when scrolling, when the end of a list is passed or reached, or when certain parts of the items are passed or reached. The items emanating in a tactile feedback can be preset, selectable by user settings, or dynamic depending on detected use of the mobile communication apparatus.

FIG. 2 shows a mobile communication apparatus 200 according to an embodiment of the present invention, similar to the one of FIG. 1, with a display 202 and a rotating input means 204. However, to enable a user to find certain items in the menu easier, the rotating input means 204 is provided with a graphical feedback. The graphical feedback can comprise a first marker 206 indicating a fixed position, and a second marker 208 indicating a position at the rotating input means corresponding to a certain item in the menu. To get to said certain item, the user has to turn the rotating input means such that the angular positions of the first and second markers 206, 208 correspond. The graphical feedback can be combined with tactile, sound and/or vibration feedback.

FIG. 3 shows a mobile communication apparatus 300 according to a further embodiment of the present invention. Here, a graphical feedback comprises a first marker 302 indicating a fixed position, and a second and a third marker 304, 306, each indicating a position at the rotating input means corresponding to a certain item in the menu. The visual appearance of the second and third markers 304, 306 differ, e.g. by different colors or different patterns. For example, the second marker 304 can indicate the angular position corresponding to a last used item and the third marker 306 can indicate the angular position corresponding to an end of the list. The graphical feedback can be combined with tactile, sound and/or vibration feedback.

FIG. 4 shows a mobile communication apparatus 400 according to a further embodiment of the present invention. Here, a graphical feedback comprises a marked area 402 corresponding to a certain partition of selectable items. For example, the partition of items can be messaging services which may be handy to find quickly. One or more areas can be marked in similar or different ways, e.g. different color or pattern. The graphical feedback can be combined with tactile, sound and/or vibration feedback.

FIGS. 1-4 have been used to show a plurality of feedback alternatives for rotating input means. However, an embodiment of the present invention is a combination of these feedback alternatives. For example, one or some items can be associated with a sound feedback, another or others can be associated with a tactile feedback, another with vibration feedback, etc. Some items can be associated with two or more of the above mentioned feedback alternatives.

The markers of the aforementioned embodiments are implemented by using a transparent wheelpad for the rotating input means. Below the wheelpad, an addressable indicator is provided. By addressing different parts, by control of the processor of the mobile communication apparatus, the markers are provided according to the angular position of the certain items in relation to the actual position of the wheelpad.

FIG. 5 schematically shows an implementation of a rotating input means 500. The implementation comprises a wheelpad 502, a sensor 504 for detecting angular movements of the wheelpad 502, and a processor 506. When the wheelpad 502 is rotated in any direction, the sensor 504 detects how much and in which direction the wheelpad 502 is rotated. The sensor 504 generates a signal accordingly, and sends the signal to the processor 506. The processor outputs a feedback signal associated with a selectable item accordingly, and the feedback signal controls provision of a marker by an addressable indicator (not shown) below the wheelpad, or provision of a tactile feedback by increasing rotation resistance of the wheelpad or actuating a vibration function or a sound presentation. Increased resistance can be provided by means integrated in the sensor 504, or by serarate means (not shown), e.g. by electromagnetical actuation.

FIG. 6 shows a flow chart of a method according to an embodiment of the present invention. In a menu presentation step 602, a menu is presented on a display of a mobile communication apparatus, or at least as much of the menu that fits into the display. The menu can comprise text, icons, tabs or the like, and is provided by a processor of the mobile communication apparatus. In a feedback provision step 604, feedback is provided by tactile and/or visual feedback to a user, depending on angular position of the rotating input means and the position of certain items in the menu. In an input reception step 606, a selection of an item in the menu is performed by a user. The order in which the steps 602, 604, 606 should not be considered with any timing constraints. Contrary, an implementation of this embodiment would render that the steps 602, 604, 606 are performed in any order, different from time to time, and not seldom in parallel, as is the case for real-time operations.

FIG. 7 shows a flow chart of sub-steps of the feedback provision step 604 of FIG. 6. In a position determination step 702, one or more positions, or one or more areas corresponding to a range of positions, are determined to correspond to one or more certain items of a menu. The positions are expressed as angular positions of a wheelpad of a rotating input means. In a position marking step 704, the one or more positions, or one or more areas corresponding to a range of positions, are marked for feedback. Different positions can be marked in different ways, as is explained above with reference to FIGS. 3 and 4. The positions can also be marked for tactile feedback, such as increased rotational resistance or activated vibrating function. It is also possible to set sound markers.

The invention claimed is:

1. A mobile communication apparatus comprising processor means and a user interface, said interface comprising a display and an input means, said input means comprising a rotating input means arranged to provide an angular movement signal in accordance with an angular movement of said rotating input means for selecting an item from a plurality of selectable items arranged to be presented on said display, wherein one or more of said selectable items are associated with a feedback signal, wherein said rotating input means is arranged to provide feedback according to said feedback signal to a user when operating said rotating input means in a position related to said items associated with a feedback signal.

2. The mobile communication apparatus according to claim 1, wherein said feedback signal indicates graphical presentation, such that said feedback is presented graphically.

3. The mobile communication apparatus according to claim 2, wherein said graphically presented feedback is a visual mark at the rotating input means corresponding to a position related to an item associated with a feedback signal, wherein said item comprises a last selected item.

4. The mobile communication apparatus according to claim 2, wherein said graphically presented feedback is a marked area of said rotating input means corresponding to positions related to a group of items associated with a feedback signal.

5. The mobile communication apparatus according to claim 1, wherein said feedback signal indicates tactile presentation, such that said feedback is tactile.

6. The mobile communication apparatus according to claim 5, wherein said tactile feedback correspond to a position related to an item associated with a feedback signal, wherein said item comprises a last selected item.

7. The mobile communication apparatus according to claim 5, wherein said tactile feedback corresponds to position related to an end item of a list of said selectable items.

8. The mobile communication apparatus according to claim 1, wherein said feedback signal indicates a sound presentation, such that said feedback is a sound.

9. The mobile communication apparatus according to claim 8, wherein said sound feedback correspond to a position related to an item associated with a feedback signal, wherein said item comprises a last selected item.

10. The mobile communication apparatus according to claim 8, wherein said sound feedback corresponds to position related to an end item of a list of said selectable items.

11. The mobile communication apparatus according to claim 1, wherein said feedback signal indicates graphical presentation, such that said feedback is presented graphically.

12. An input method for a mobile communication apparatus comprising processor means and a user interface, said user interface comprising a display and an input means, said input means comprising a rotating input means arranged to provide an angular movement signal in accordance with an angular movement of said rotating input means, said method comprising the steps of:
  presenting a menu comprising a plurality of items from a plurality of selectable items on said display, wherein one or more of said selectable items are associated with a feedback signal;
  providing a feedback according to said feedback signal; and
  receiving an input by said rotating input means corresponding to a selection of one of said plurality of selectable items.

13. The method according to claim 12, wherein said provision of feedback comprises the step of providing a graphical presentation at the rotating input means.

14. The method according to claim 13, wherein said graphical presentation is a visual mark at a position of the rotating input means corresponding to a last selection performed by said rotating input means.

15. The method according to claim 13, wherein said graphical presentation is a marked area at the rotating input means corresponding to a partition of selectable items.

16. The method according to claim 12, wherein said provision of feedback comprises the step of temporarily increasing rotation resistance of said rotating input means.

17. The method according to claim 16, wherein said temporary increase of rotation resistance correspond to a position of the rotating input means corresponding to a last selection performed by said rotating input means.

18. The method according to claim 16, wherein said temporary increase of rotation resistance corresponds to a position of the rotating input means corresponding to an end of a list of said plurality of selectable items.

19. The method according to claim 12, wherein said provision of feedback comprises the step of presenting a sound.

20. The method according to claim 19, wherein said presentation of sound correspond to a position of the rotating input means corresponding to a last selection performed by said rotating input means.

21. The method according to claim 19, wherein said presentation of sound corresponds to a position of the rotating input means corresponding to an end of a list of said plurality of selectable items.

22. The method according to claim 12, wherein said provision of feedback comprises the step of generating a vibration.

23. The method according to claim 22, wherein said generation of vibration correspond to a position of the rotating input means corresponding to a last selection performed by said rotating input means.

25. The method according to claim 23, wherein said generation of vibration corresponds to a position of the rotating input means corresponding to an end of a list of said plurality of selectable items.

25. An apparatus comprising:
a processor means and a user interface, said user interface comprising a display and an input device, said input device comprising a rotating input device configured to provide an angular movement signal in accordance with an angular movement of said rotating input device for selecting an item from a plurality of selectable items arranged to be presented on said display, wherein one or more of said selectable items are associated with a feedback signal, wherein said rotating input device is configured to provide feedback according to said feedback signal to a user when operating said rotating input device in a position related to said items associated with a feedback signal.

* * * * *